July 11, 1967 C. H. SINGLE 3,330,948
DERIVATIVE CHECKING CIRCUIT FOR USE IN A COMPUTER HAVING
A PLURALITY OF INTEGRATORS
Filed April 23, 1963
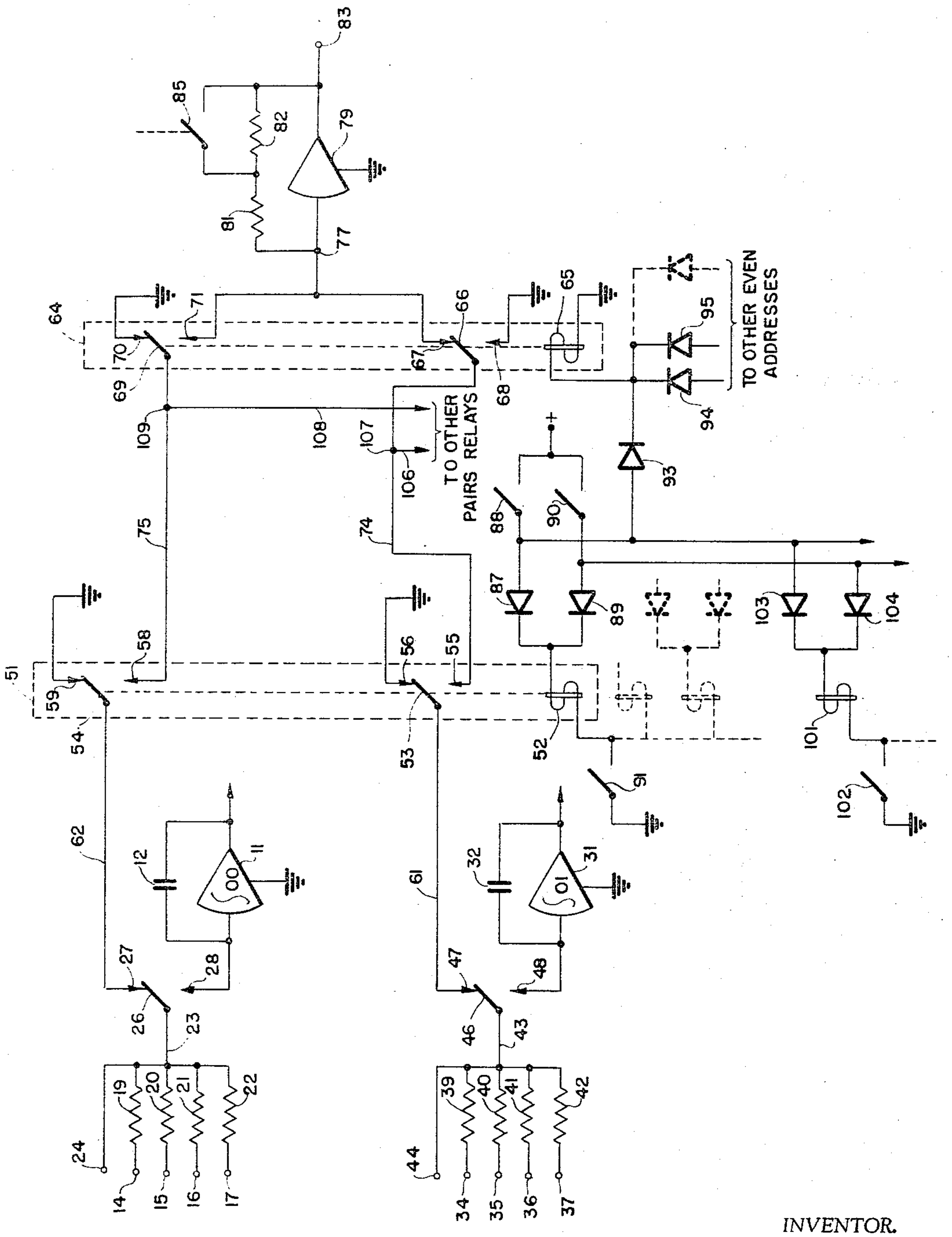
INVENTOR.
CHARLES H. SINGLE
BY Paul R. Harder
ATTORNEY United States Patent Office 3,330,948

Patented July 11, 1967

3,330,948

DERIVATIVE CHECKING CIRCUIT FOR USE IN A COMPUTER HAVING A PLURALITY OF INTEGRATORS

Charles H. Single, Pleasant Hill, Calif., assignor to Beckman Instruments, Inc., a corporation of California Filed Apr. 23, 1963, Ser. No. 275,039
14 Claims. (Cl. 235—184)

The present invention relates to electronic computers and more particularly to a method and apparatus for checking electronic analog computers.

Present day electronic computers have achieved a high degree of accuracy. This accuracy is, however, dependent upon the proper selection of equations to represent the physical system, the mechanization or adaption of these equations for use in the analog computer, the implementation of the mechanization and proper functioning of the various computer components. In setting up a computer for the proper solution of a particular problem several hundred or more connections and settings must generally be made by an operator resulting in the possibility of human error in addition to the possibility of improper operation of the various components within the computer. In order to minimize the time required to ascertain, isolate and correct these various errors it is desirable to provide various methods and apparatus for checking the computer.

The mechanization of a particular problem will generally require the utilization of a number of integrators throughout the computer. For proper functioning of the integrator the mechanization will require the proper selection of various precision input resistors, the utilization of proper scaling factors and proper patch connections in order to provide a proper input current at the summing junction of the integrator. This inut or driving signal may represent the output of various other components in the system. Therefore, by providing a method and apparatus for checking the signal at the summing junctions of the various integrators, a means is provided for initially determining that proper patching and coefficient potentiometer settings have been accomplished. By placing the computer in the HOLD mode during the problem solution, derivatives at an arbitrary time can conveniently be measured providing a check of the operation of components ahead of the particular summing junctions. The summing junction signals also provide values which may be substituted into the original equations through proper scale factors to confirm that proper equation balance is being maintained on a dynamic basis.

It is therefore an object of the present invention to provide a method and apparatus for selectively checking the input signal to the various integrators within an analog computer.

Another object is to provide a method and apparatus for checking the input signal to an integrator at any time during the solution of a problem without the necessity of incorporating any additional check modes; that may be incorporated in new computer equipment or in existing computer equipment at low cost and without requiring any additional computations.

As is well known in the art an integrating circuit generally operates to maintain the potential at the summing junction at a common reference potential generally circuit ground. In order to provide proper checking it is then desirable to maintain the particular summing junction being checked at ground potential while providing an output signal indicative of the signal at the summing junction. To accomplish the foregoing objects the present invention generally contemplates the connection of all integrator summing junctions to ground except the particular summing junction of the integrator which has been addressed for checking. This summing junction is connected to a checking circuit which converts the signal current at the summing junction to an output voltage while maintaining the summing junction at the ground potential.

Other objects and many of the attendant advantages of this invention will be more readily apparent and better understood by reference to the following detailed description when read in conjunction with the accompanying drawing which represent only an exemplary preferred embodiment of the invention.

The single figure of the drawing is a schematic circuit diagram of a pair of integrators embodying the present invention for use in an electronic analog computer system.

Referring now to the drawing in detail there is illustrated integrators 00 and 01 which may comprise a single pair of any number of integrators within the computer console. Integrator 00 comprises a single-ended, high gain operational amplifier 11 having a storage device or capacitor 12 connected between the output and grid terminals thereof. Input terminals 14–17 are respectively connected through input resistors 19–22 to a common lead or summing junction 23. Terminal 24 is directly connected to the summing junction 23 and forms a summing junction terminal which may be utilized in a manner familiar to those skilled in the art such, for example, as an initial condition input terminal. A compute relay comprising a movable contact 26 and a pair of fixed contacts 27 and 28 serves to connect the summing junction to the grid terminal of amplifier 11 through contact 28 when the relay is energized and grounds the summing junction through contact 27 when unenergized as is the case when the integrator is not actually integrating as will be more fully set forth as the description proceeds.

Integrator 01 also comprises a single-ended, high gain operational amplifier 31, a storage device or capacitor 32 and input terminals 34–37 connected through precision input resistors 39–42 to a common lead or summing junction 43 in the same manner as integrator 00 is connected. Summing junction terminal 44 is directly connected to the summing junction lead 43 and a separately energized compute relay comprising movable contact 46 and fixed contacts 47 and 48 is connected in like manner as the compute relay of integrator 01.

A pairs relay 51 is provided for connecting the summing junction to the checking circuitry. The pairs relay has an operating coil 52 and a pair of movable contacts 53 and 54. Fixed contacts 55 and 56 are associated with movable contact 53 and fixed contacts 58 and 59 are associated with movable contact 54. Relay 51 is constructed in such a manner that, in the unenergized condition, movable contact 53 engages fixed contact 56 such that lead 61 interconnecting the movable contact 53 with fixed contact 47 of the compute relay for integrator 01 is connected to a point of common potential such, for example, as ground. Likewise, lead 62 interconnecting the movable contact 54 with the fixed contact 27 of the compute relay of integrator 00 is connected through fixed contact 59 to the point of common potential.

An odd-even select relay 64 has an operating coil 65, a first movable contact 66, a pair of fixed contacts 67 and 68 associated with movable contact 66 and a second movable contact 69 having fixed contacts 70 and 71 associated therewith. Lead 74 connects the movable contact 66 of odd-even select relay 64 with fixed contact 55 of the pairs select relay 51. Similarly, lead 75 connects movable contact 69 of relay 64 with the fixed contact 58 of relay 51. In the unenergized condition movable contact 69 engages fixed contact 70 which is connected to the point of common potential and movable contact 66 engages fixed contact 67 which is connected to junction 77. Odd-even select relay 64 operates upon energization of operating coil 65 such that movable contact 66 engages fixed contact 68 connecting line 74 to the point of common potential. Movable contact 69 transfers to fixed contact 71 such that in the energized condition line 75 is connected to junction 77.

Junction 77 constitutes the input or grid terminal of a single-ended, high gain operational amplifier 79 having a pair of resistors 81 and 82 connected in electrical series circuit between the output of the amplifier and the input terminal or junction 77. The output of amplifier 79 is connected to output terminal 83 which constitutes the output terminal of the checking circuitry. Resistors 81 and 82 constitute a pair of feedback resistors, resistor 82 being shunted by switch 85 so that an appropriate scaling factor may be selected for the output of amplifier 79. Switch 85 may be operated by any suitable external circuitry, the details of which constitute no part of this invention.

Generally, a large number of integrators are provided in an analog computer and it is desirable to individually check the input signal at the summing junction. To accomplish this utilizing a minimum number of relays and components, a relay coil matrix is provided operated from the computer addressing system. The matrix to be described is capable of conveniently handling up to 100 integrators consecutively numbered from 00 through 99. As has been hereinbefore pointed out the integrators are divided into pairs and a pairs relay is provided for each pair of integrators. Each pairs relay is identical in construction and connected to its associated pair of integrators in the same manner as pairs relay 51 is connected to integrators 00 and 01 as illustrated in the drawing. The system is arranged in such a manner that only one odd-even select relay, relay 64, is utilized for all integrators 00–99.

One side of operating coil 52 of pairs relay 51 is connected through a parallel circuit to a point of positive potential. One branch of the parallel circuit includes isolating diode 87 and an even "units" switch 88 and the other branch includes isolating diode 89 and an odd "units" switch 90. The other side of operating coil 52 is returned to the point of common potential through "tens" switch 91. Isolating diode 93 has its cathode connected to one side of operating coil 65 of odd-even select relay 64 and its anode connected through even "units" switch 88 to the point of positive potential. The other end of the operating coil 65 is connected directly to the point of common potential.

Each of the other pairs relay for the next four pairs of integrators, that is integrators 02 through 09 have one side of their operating coil connected to the point of positive potential through respective parallel branches identical to that connected to operating coil 52. The other side of these operating coils is returned to the point of common potential through "tens" relay 91. Isolating diode 94 is connected to the junction of the isolating diode and the even "units" switch for the second pair of integrators, that is, integrators 02 and 03, diode 95 will be connected to the same point in the next pair, etc. Thus, one side of odd-even relay coil 65 will be connected through five isolating diodes and the respective even "units" switch in each of the first five pairs to the point of positive potential.

Each subsequent group of five pairs relays are connected through a common "tens" switch to the point of reference potential and the other side of the operating coil is connected through a pair of isolating diodes to the appropriate "units" switch associated with the first five pairs. For example, operating coil 101 is associated with the pairs relay that connects either integrator 10 or 11 to the checking circuitry. One side of operating coil 101 is returned through "tens" switch 102 to the point of common potential and the other side is connected through diode 103 and even "units" switch 88 to the point of positive potential and also through diode 104 and the odd "units" switch 90 to the point of positive potential.

The "tens" and "units" switches may be of any suitable type and are operated by an appropriate signal from the computer addressing system. The "units" switches are operated from the "units" address lines of the computing address system and provide a positive voltage at the top of the matrix relay coils to provide the vertical signal of the matrix. The "tens" switches are operated from the "tens" address lines and provide a ground signal to the bottom of the appropriate matrix relay coils. This provides the horizontal signal of the matrix. Each "units" line and each "tens" line from the computer addressing system services five matrix relays. However, only one matrix relay will receive both the "tens" ground signal at one end of its operating coil and the positive voltage "units" signal at the other end.

In operation, let it be presumed that the computer is in the check mode and that it is desirable to check the input to integrator 01. In the check mode all of the compute relays, and consequently compute relays 26 and 46 of integrator 00 and 01, are unenergized. Summing junction 23 of integrator 00 is thus connected through movable contact 26, fixed contact 27, line 62, movable contact 54 and fixed contact 59 of the pairs relay 51 to the point of common potential. Likewise, summing junction 43 of integrator 01 is connected through movable contact 46 and fixed contact 47 to the point of common potential via line 61, movable contact 53 and fixed contact 56 of pairs relay 51. Thus, all summing junctions are initially connected to the point of common potential.

Upon address of integrator 01 by the computer addressing system a signal is placed on the 1 "units" line which operates to close the 1 "units" switch, that is, switch 90. Therefore, all of the pairs relays associated with the 1 "units" switch, that is, those pairs relays associated with integrators 01, 11, 21 . . . 91, receive a positive potential at one side of their operating coil through the appropriate isolating diode. The "tens" switch associated with the 0 "tens" line of the computer addressing system, that is, "tens" switch 91, receives a signal which causes closure thereof. Thus, all of the pairs relays associated with the 0 "tens" switch, i.e., the relays associated with integrators 00–09 receive a ground signal at one end of their coils. Since now switches 90 and 91 are closed pairs relay 51 associated with integrators 00 and 01 operates. This is the only relay coil in the matrix which receives both a "tens" and a "units" signal. Due to the blocking action of isolating diode 87 no potential is applied to the operating coil 65 of odd-even select switch 64 and this relay remains unenergized.

Summing junction 23 of integrator 00 remains connected to the point of common potential but now via movable contact 54, fixed contact 58, line 75, movable contact 69 and fixed contact 70. However, due to the transfer of movable contact 53 to fixed contact 54 the summing junction 43 of integrator 01 is now connected through line 74, movable contact 66 and fixed contact 67 of odd-even select relay 64 to the input junction 77 of the external operational amplifier 79. Thus, an output appears at the checking circuit output terminal 83 which is equal or proportional to the current at summing junction 43, depending upon the condition of the scaling factor switch 85, and operational amplifier 79 operates to hold junction 77 and therefore summing junction 43 at ground potential.

If the input signal to integrator 00 is to be checked, the computer addressing system operates by applying appropriate signals to the 0 "tens" line and to the 0 "units" line and switches 88 and 91 are closed. The pairs relays associated with integrators 00, 10, 20 . . . 90 receive a positive signal but only relay coil 52 associated with integrator 00 also receives a "tens" or ground signal. Again pairs relay 51 is the only relay in the matrix to operate. Now, however, since an even "units" address switch is closed, that is switch 88, a positive signal is received at one end of operating coil 65 of the odd-even select switch via isolating diode 93 and relay 64 also operates. The summing junction 43 of integrator 01 is connected to the point of common potential via movable contact 66 and fixed contact 68 of the odd-even select relay and summing junction 23 of integrator 00 is now connected to the input junction 77 of external operational amplifier 79 through movable contact 69 and fixed contact 71. The output at terminal 83 is therefore equal or proportional to the current at summing junction 23 which is held at ground potential.

The fixed contacts of the other pairs relays corresponding to fixed contact 55 of relay 51, that is, the fixed contact associated with the odd numbered integrators are connected to line 74 via line 106 forming a first common junction 107. Likewise the fixed contacts associated with the even numbered integrators and corresponding to fixed contact 58 of pairs relay 51 are connected to line 75 via line 108 to form a second common junction 109. Therefore, only one odd-even select relay is needed and any of the 99 integrators may be selectively connected to the input junction 77 of the operational amplifier. For example, if integrator 10 is to be checked the computer addressing system closes relays 102 connected to the 1 "tens" line and switch 88 controlled by the 0 "units" line. A circuit is completed from the source of positive potential through switch 88, diode 103, relay coil 101 and switch 102. Odd-even select relay 64 is also operated by virtue of the anode of isolating diode 93 being connected to the source of positive potential through switch 88.

As has been hereinbefore set forth the checking circuitry herein disclosed provides a check of the derivative input to the various integrators throughout the computer by connecting the summing junction input signal to a readout terminal. By initial selective checking of the various summing junction signals a convenient method of initially determining that proper patching, proper input resistor selection and proper coefficient potentiometer settings have been accomplished. Further, by placing the computer in the HOLD mode during the problem solution, derivatives at arbitrary times can conveniently be measured providing a check of the operation of various components ahead of the particular summing junction. These summing junction signals also provide values which may be substituted into the original equations through proper scaling factors to confirm that proper equation balance is being maintained on a dynamic basis.

There has been illustrated and described a novel derivative checking circuit for selectively checking the input signals at the summing junctions of the various integrators within an analog computer. Although the invention has been described with particularity in connection with the particular exemplary embodiment illustrated in the drawing it should be understood that various modifications and variations thereof are apparent to and within the scope of those skilled in the art without departing from the scope of the appended claims.

What is claimed is:

1. A derivative checking circuit for use in an analog computer having a plurality of integrators each having a summing junction, the combination of:
  - a plurality of switch means each connected to a respective pair of said summing junctions for connecting said summing junctions to a point of reference potential;
  - a select switch means;
  - said plurality of switch means being operable to connect a selected pair of said summing junctions to said select switch means;
  - an output terminal and a point of reference potential;
  - said select switch means being operable to connect one of the summing junctions of said selected pair to said output terminal and the other summing junction of said selected pair to said point of reference potential and means connected to said output terminal for providing an output signal indicative of the signal at the summing junction connected thereto by said select switch means.

2. A derivative checking circuit for use in an analog computer having a plurality of integrators each having a summing junction, the combination of:
  - a plurality of switch means each connected to a respective pair of said summing junctions for connecting said summing junctions to a point of reference potential;
  - an output circuit and a point of reference potential;
  - a select switch means connected to said output circuit;
  - said plurality of switch means being operable to connect a selected pair of said summing junctions to said select switch means; and
  - said select switch means being operable to connect one of the summing junctions of said selected pair to said output circuit and the other junction of said selected pair to said point of reference potential.

3. A derivative checking circuit for use in an analog computer having a plurality of integrators each having a summing junction, the combination of:
  - a plurality of switch means each connected to a respective pair of said summing junctions for connecting said pair of summing junctions to a point of reference potential;
  - a select switch means;
  - said plurality of switch means being operable to connect a selected pair of summing junctions to said select switch means;
  - an output circuit and a point of reference potential; and
  - said select switch means being operable to connect one of the summing junctions of said selected pair to said output circuit and the other junction of said selected pair to said point of reference potential, said output circuit being operable to maintain said one summing junction at said reference potential and providing an output signal that is a function of the signal at said one summing junction.

4. In an analog computer of the type having a plurality of integrators each having a summing junction, the improvement comprising:
  - a plurality of switch means each connected to a respective pair of said summing junctions for connecting said summing junctions to a point of reference potential;
  - a pair of common junctions;
  - each of said switch means being operable to connect one summing junction of a selected pair of summing junctions to one of said common junctions and the other summing junction of said selected pair of summing junctions to the other of said common junctions;
  - an output circuit and a point of reference potential; and
  - a select switch means connected to said output circuit, said select switch means normally connecting said one common junction to said point of reference potential and the other common junction to said output circuit, said select switch means being operable to connect said one common junction to said output circuit and said other common junction to said point of reference potential.

5. In an analog computer of the type having a plurality of integrators each having a summing junction, the improvement comprising:
  - a plurality of switch means each connected to a respective pair of said summing junctions for connecting said summing junctions to a point of reference potential;
  - a pair of common junctions;
  - each of said plurality of switch means being operable to connect one summing junction of a selected pair of summing junctions to one of said common junctions and the other summing junction of said selected pair of summing junctions to the other of said common junctions;

an output circuit and a point of reference potential; and a select switch means connected to said output circuit, said select switch means normally connecting said one common junction to said point of reference potential and said other common junction to said output circuit, said select switch means being operable to connect said one common junction to said output circuit and said other common junction to said point of reference potential, said output circuit being operable to maintain the common junction connected thereto at said reference potential and providing an output signal that is a function of the signal at the common junction connected thereto.

6. In a derivative checking circuit for use in an analog computer having a plurality of integrators each having a summing junction, said analog computer further having an integrator address system, the combination of:

a plurality of switch means each connected to a respective pair of summing junctions for connecting said summing junctions to a point of reference potential;

a select switch means;

an integrator address system;

means operating one of said plurality of switch means according to information received from said integrator address system for addressing an integrator having its summing junction connected to said one switch means to connect said respective pair of summing junctions connected thereto to said select switch means;

an output circuit; and said select switch means being operable to connect the summing junction of said addressed integrator to said output circuit.

7. A derivative checking circuit for use in an analog computer having a plurality of integrators each having a summing junction, said analog computer further having an integrator address system, the combination of:

a plurality of switch means each connected to a respective pair of summing junctions for connecting said summing junctions to a point of reference potential;

a select switch means;

an integrator address system;

means operating one of said plurality of switch means according to information received from said integrator address system for addressing an integrator having its summing junction connected to said one switch means to connect said respective pair of summing junctions connected thereto to said select switch means;

an operational feedback amplifier having an input and an output terminal; and said select switch means being operable to connect the summing junction of said addressed integrator to the input terminal of said amplifier, said amplifier being operable to maintain said input terminal at said reference potential and providing an output signal that is a function of the signal at the summing junction of said addressed integrator.

8. A derivative checking circuit for checking the input signal at one of a pair of summing junctions respectively connected to a pair of integrators, the combination of:

means for connecting said pair of summing junctions to respective ones of a first set of contacts connected to a point of reference potential;

a second set of contacts;

an output terminal and a point of reference potential;

said means including means for disconnecting said pair of summing junctions from said first set of contacts and connecting said summing junctions to respective ones of said second set of contacts, one of said second set of contacts being normally connected to said reference potential and the other being normally connected to said output terminal; and means for connecting said one of said second set of contacts to said output terminal and said other contact to said reference potential.

9. A derivative check circuit for use in an analog computer having a plurality of integrators each having a summing junction, said analog computer further having an integrator address system, the combination of:

a plurality of switch means each connected to a respective pair of summing junctions for connecting said summing junctions to a point of reference potential;

a select switch means connected to an output circuit;

an output circuit and a point of reference potential;

means for selectively operating one of said plurality of switch means on address of an integrator whose summing junction is connected to said one switch means for connecting said respective pair of summing junctions to said select switch means;

an integrator address system;

said select switch means normally connecting one of said respective pair of said summing junctions to said point of reference potential and the other of said respective pair of said summing junctions to said output circuit, said select switch means being operable according to information received from said integrator address system for addressing the integrator associated with said one of said respective pair of summing junctions to connect said one of said respective pair of summing junctions to said output circuit and the other of said respective pair of said summing junctions to said point of reference potential;

said address system including respective first, second and third address responsive means connected to each of said plurality of switch means;

each of said first and second address responsive means being operable to connect a point of positive potential to a respective one of said plurality of switch means and said third address responsive means being operable to connect said respective switch means to a point of common potential;

means isolating said first and second address responsive means one from the other;

means respectively connecting said first address responsive means to said select switch means for operating said select switch means when said first address responsive means is addressed whereby when either said first or said second address responsive means and said third responsive means are addressed said respective switch means operates and when said first address responsive means is addressed said select switch means operates.

10. In an analog computer of the type having a plurality of integrators each having a summing junction, the improvement comprising:

a plurality of switch means each including first, second, third and fourth contacts;

means for connecting a respective pair of summing junctions to each of said plurality of switch means;

a point of reference potential;

means for connecting said first and third contacts of each of said switch means to said point of reference potential;

means connecting said second contact of each of said switch means to a first common junction;

means connecting said fourth contact of each of said switch means to a second common junction;

a select switch means having first, second, third and fourth contacts;

means for connecting said first and fourth contacts of said select switch means to said point of reference potential;

means connecting said second and third contacts of said select switch means to a third common junction;

each of said plurality of switch means connecting one of said respective pair of summing junctions to said first contact of said switch means and the other of said respective pair of summing junctions to said third contact of said switch means;

means connecting said first common junction to said first contact of said select switch means and said second common junction to said third contact of said select switch means;

each of said switch means being selectively operable to connect said one of said respective pair of summing junctions to said second contact of said switch means and said other of said respective pair of said summing junctions to said fourth contact of said switch means; and said select switch means being operable to connect said first common junction to said second contact of said select switch means and said second common junction to said fourth contact of said select switch means.

11. The combination of claim 10 further comprising:

an output circuit connected to said third common junction, said output circuit operable to maintain said third common junction at said point of reference potential and provide an output voltage signal that is a function of the current at said third common junction.

12. The combination of claim 11 wherein said output circuit includes:

an operational amplifier having an input terminal and an output terminal;

means connecting said input terminal to said third common junction; and variable feedback means connected between said input terminal and said output terminal for providing a variable scaling factor for said output circuit.

13. The method of checking the input signal at the summing junction of a selected one of a plurality of integrators by selectively connecting it to a test output circuit, comprising the steps of;

connecting the summing junction of each of the integrators to a point of reference potential;

disconnecting a pair of said summing junctions from said point of reference potential;

reconnecting one of said pair of summing junctions to said point of reference potential; and connecting the other of said pair of summing junctions to said test output circuit.

14. The method of checking the input signal at the summing junction of a selected one of a plurality of integrators by selectively connecting it to a test output circuit, including the steps of:

connecting the summing junction of each of said integrators to a point of reference potential;

disconnectnig a pair of summing junctions from said point of reference potential;

reconnecting one of said pair of summing junctions to said point of reference potential;

connecting the other of said pair of summing junctions to said test output circuit; and said test output circuit providing an output voltage signal that is a function of the input current at said other of said pair of summing junctions while holding said one of said pair of summing junctions at said point of reference potential.

References Cited

UNITED STATES PATENTS

| | | | |
|---|---|---|---|
| 3,231,728 | 1/1966 | Kusto | 235—183 |
| 3,231,729 | 1/1966 | Stern | 235—183 |

OTHER REFERENCES

Pages 97–99, July 1955—McCoy, R. D. et al. Problem Checker Checks Computer Too. In Control Engineering, vol. 2, No. 7.

Pages 210–220, 1956—Johnson, C. L. Analog Computer Techniques, McGraw-Hill Co., New York.

MALCOLM A. MORRISON, *Primary Examiner.*

I. KESCHNER, *Assistant Examiner.*